US012633544B2

(12) United States Patent
Kim et al.

(10) Patent No.: US 12,633,544 B2
(45) **Date of Patent: *May 19, 2026**

(54) CONDUCTIVE MATERIAL DISPERSION, AND ELECTRODE AND LITHIUM SECONDARY BATTERY MANUFACTURED USING THE SAME

(71) Applicant: LG Energy Solution, Ltd., Seoul (KR)

(72) Inventors: Dong Hyun Kim, Daejeon (KR); Houng Sik Yoo, Daejeon (KR); Seong Kyun Kang, Daejeon (KR); Gye Min Kwon, Daejeon (KR); Hyeon Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/989,902

(22) Filed: Dec. 20, 2024

(65) Prior Publication Data

US 2025/0132347 A1 Apr. 24, 2025

Related U.S. Application Data

(63) Continuation of application No. 18/377,994, filed on Oct. 9, 2023, now Pat. No. 12,218,359, which is a continuation of application No. 17/604,084, filed as application No. PCT/KR2020/006238 on May 12, 2020, now Pat. No. 11,824,200.

(30) Foreign Application Priority Data

May 17, 2019 (KR) ........................ 10-2019-0057722

(51) Int. Cl.

| | |
|---|---|
| ***H01B 1/24*** | (2006.01) |
| ***C01B 32/174*** | (2017.01) |
| ***C09C 1/56*** | (2006.01) |
| ***H01M 4/62*** | (2006.01) |
| ***H01M 10/0525*** | (2010.01) |
| *H01M 4/02* | (2006.01) |

(52) U.S. Cl.

CPC ........... *H01M 4/625* (2013.01); *C01B 32/174* (2017.08); *C09C 1/56* (2013.01); *H01B 1/24* (2013.01); *H01M 10/0525* (2013.01); *C01B 2202/22* (2013.01); *C01B 2202/32* (2013.01); *C01P 2006/12* (2013.01); *C01P 2006/40* (2013.01); *H01M 2004/028* (2013.01)

(58) Field of Classification Search

CPC . H01B 1/00; H01B 1/24; H01M 4/625; C01B 32/174; C09C 1/44; C09C 1/56

See application file for complete search history.

(56) References Cited

U.S. PATENT DOCUMENTS

| | | | |
|---|---|---|---|
| 5,827,331 | A | 10/1998 | Block et al. |
| 11,824,200 | B2 | 11/2023 | Kim et al. |
| 2005/0069769 | A1 | 3/2005 | Nakayama et al. |
| 2006/0058429 | A1 | 3/2006 | Poellmann et al. |
| 2006/0257738 | A1 | 11/2006 | Kim et al. |
| 2012/0037853 | A1 | 2/2012 | Unagami et al. |
| 2015/0159030 | A1 | 6/2015 | Decker et al. |
| 2016/0020466 | A1 | 1/2016 | Ulbrich et al. |
| 2016/0200850 | A1 | 7/2016 | Hatanaka et al. |
| 2017/0080397 | A1 | 3/2017 | Ishigure et al. |
| 2018/0175370 | A1 | 6/2018 | Kim et al. |
| 2018/0198129 | A1 | 7/2018 | Kim et al. |
| 2018/0219212 | A1 | 8/2018 | Seol et al. |
| 2018/0277848 | A1 | 9/2018 | Matsumura et al. |
| 2019/0218326 | A1 | 7/2019 | Hatanaka et al. |
| 2019/0248944 | A1 | 8/2019 | Nagai et al. |
| 2020/0028174 | A1 | 1/2020 | Ahn et al. |

FOREIGN PATENT DOCUMENTS

| | | | |
|---|---|---|---|
| CN | 1768439 | A | 5/2006 |
| CN | 102414282 | A | 4/2012 |
| CN | 105074966 | A | 11/2015 |
| CN | 105473216 | A | 4/2016 |
| CN | 109565050 | A | 4/2019 |
| JP | 2006505661 | A | 2/2006 |
| JP | 2015053165 | A | 3/2015 |
| JP | 2018001099 | A | 1/2018 |
| JP | 2018534731 | A | 11/2018 |
| JP | 2018534747 | A | 11/2018 |
| JP | 2018535520 | A | 11/2018 |
| KR | 20040048997 | A | 6/2004 |
| KR | 100852386 | B1 | 8/2008 |
| KR | 20120021807 | A | 3/2012 |
| KR | 20120079597 | A | 7/2012 |
| KR | 101295351 | B1 | 8/2013 |

(Continued)

OTHER PUBLICATIONS

Khare et al "Dispersion of Multiwall Carbon Nanotubes in Blends of Polypropylene and Acrylonitrile Butadiene Styrene", Polymer Engineering and Science—2011, DOI 10.1002/pen (15 pages).*
Extended European Search Report for Application No. 20809916.8 dated May 13, 2022, pp. 1-5.
Form PCT/ISA/237 English language translation for Application No. PCT/KR2020/006238 (mail date Aug. 21, 2020). 4 pgs.
International Search Report for Application No. PCT/KR2020/006238, dated Aug. 21, 2020, 2 pages.
Le et al "Location of dispersing agent in rubber nanocomposites during mixing process", Polymer 54 (2013) 7009-7021.
Prevoteau et al "Universally dispersible carbon nanotubes", J. Am. Chem. Soc. Nov. 2012, 134, 19961-19964.4 pgs.

*Primary Examiner* — Mark Kopec

(74) *Attorney, Agent, or Firm* — Lerner David LLP

(57) ABSTRACT

A conductive material dispersion includes a carbon-based conductive material, a main dispersant, an auxiliary dispersant, and a dispersion medium, wherein the main dispersant is a nitrile-based copolymer and the auxiliary dispersant is a copolymer including an oxyalkylene unit and at least one selected from the group consisting of a styrene unit and an alkylene unit.

18 Claims, No Drawings

(56) References Cited

FOREIGN PATENT DOCUMENTS

| | | | |
|---|---|---|---|
| KR | 20150016852 | A | 2/2015 |
| KR | 101676511 | B1 | 11/2016 |
| KR | 20170069141 | A | 6/2017 |
| KR | 20180054355 | A | 5/2018 |
| KR | 20180075180 | A | 7/2018 |
| KR | 20190037277 | A | 4/2019 |
| WO | 03036744 | A1 | 5/2003 |
| WO | 2016039218 | A1 | 3/2016 |
| WO | 2017099358 | A1 | 6/2017 |

* cited by examiner

CONDUCTIVE MATERIAL DISPERSION, AND ELECTRODE AND LITHIUM SECONDARY BATTERY MANUFACTURED USING THE SAME

CROSS-REFERENCE TO RELATED APPLICATIONS

This application is a continuation of U.S. application Ser. No. 18/377,994 (now U.S. Pat. No. 12,218,359), filed on Oct. 9, 2023, which is a continuation of U.S. application Ser. No. 17/604,084 (now U.S. Pat. No. 11,824,200), filed on Oct. 15, 2021, which is a national phase entry under 35 U.S.C. § 371 of International Application No. PCT/KR2020/006238, filed on May 12, 2020, which claims the benefit of Korean Patent Application No. 10 2019-0057722, filed on May 17, 2019, in the Korean Intellectual Property Office, the disclosures of which are incorporated herein in its entirety by reference.

TECHNICAL FIELD

The present invention relates to a conductive material dispersion, and an electrode and a lithium secondary battery manufactured using the dispersion. More specifically, the present invention relates to a conductive material dispersion and an electrode and a lithium secondary battery manufactured using the same, wherein the conductive material dispersion has low viscosity properties by using a copolymer including a specific unit as an auxiliary dispersant together with a nitrile-based copolymer, which is a main dispersant.

BACKGROUND

A secondary battery is a battery which may be repeatedly used through a discharging process in which chemical energy is converted into electrical energy and a charging process in the reverse direction thereof. The secondary battery is composed of a positive electrode, a negative electrode, an electrolyte, and a separator, and in general, the positive electrode and the negative electrode are composed of an electrode current collector and an electrode active material layer formed on the electrode current collector. The electrode active material layer is prepared by applying an electrode slurry composition including an electrode active material, a conductive material, a binder, and the like on the electrode current collector, followed by drying, and then roll-pressing.

A conductive material is to improve the conductivity of the electrode active material, and fine carbon materials such as carbon black, ketjen black, fullerene, graphene, carbon nanotube (CNT), and the like are mainly used as the conductive material.

However, since conductive materials of carbon materials are easily aggregated without being uniformly dispersed in an electrode slurry composition, when an electrode is manufactured by using the same, a conductive material is not evenly distributed in an electrode active material layer. In order to overcome such a limitation, a method has been recently developed in which a conductive material is first mixed with a dispersant such as PolyVinyl Pyrrolidone (hereinafter, PVP), acrylonitrile-butadiene rubber, and the like in a solvent to prepare a conductive material dispersion, and then the conductive material dispersion is applied to an electrode slurry composition.

However, since the viscosity of a conductive material dispersion using a PVP dispersant increases rapidly when the content of a conductive material increases, there is a limit to increasing the content of the conductive material, and thus, there is a limit to improving electrical conductivity.

Meanwhile, in order to lower the viscosity of a conductive material dispersion, it is preferable to use a dispersant having a low weight average molecular weight. However, in the case of an acrylonitrile-butadiene rubber dispersant, there is a problem in that the storage stability thereof rapidly degrades due to gelation when the weight average molecular weight is lowered.

Meanwhile, the solid content of a positive electrode slurry is determined according to the solid amount of a conductive material dispersion, and when the solid content of a positive electrode slurry is high, there are effects such as the increase in productivity, improvement in electrode drying efficiency and binder migration, improvement in adhesion force, and the like. Therefore, it is preferable to increase the solid content of the conductive material dispersion, but the viscosity increases when the solids content increases, and thus, there is a problem in processability.

Therefore, there is a demand for developing a conductive material dispersion having low viscosity properties even when the conductive material content is high.

Technical Problem

An aspect of the present invention provides a conductive material dispersion having low viscosity properties compared with an existing conductive dispersion by using a copolymer including a specific unit as an auxiliary dispersant together with a nitrile-based copolymer dispersant in the conductive material dispersion.

Another aspect of the present invention provides an electrode and a lithium secondary battery manufactured using the conductive material dispersion.

Technical Solution

According to an aspect of the present invention, there is provided a conductive material dispersion including a carbon-based conductive material, a dispersant, and a dispersion medium, wherein the dispersant includes a main dispersant and an auxiliary dispersant, and the main dispersant is a nitrile-based copolymer and the auxiliary dispersant is a copolymer including an oxyalkylene unit and at least one selected from the group consisting of a styrene unit and an alkylene unit.

According to another aspect of the present invention, there is provided an electrode including an electrode active material layer formed of an electrode slurry composition containing an electrode active material, the conductive material dispersion, a binder, and a solvent. At this time, the electrode may be a positive electrode.

According to yet another aspect of the present invention, there is provided a lithium secondary battery including a positive electrode, a negative electrode, a separator interposed between the positive electrode and the negative electrode, and an electrolyte. At this time, the positive electrode may be the electrode according to the present invention.

Advantageous Effects

A conductive material dispersion according to the present invention uses a nitrile-based copolymer together with a copolymer including an oxyalkylene unit and a styrene unit and/or an alkylene unit, and thus, has lower viscosity properties than a conductive material dispersion using a nitrile-based copolymer dispersant alone. Accordingly, the solid content in the conductive material dispersion may be increased compared to an existing conductive dispersion, and as a result, when manufacturing an electrode, there may be effects such as the increase in productivity, improvement in electrode drying efficiency and binder migration, improvement in adhesion force, and the like.

DETAILED DESCRIPTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present specification, the terms "include," "comprise," or "have" are intended to specify the presence of stated features, numbers, steps, elements, or combinations thereof, and do not preclude the presence or addition of one or more other features, numbers, steps, elements, or combinations thereof.

In the present specification, "specific surface area" is measured by a BET method, and specifically, may be calculated from the adsorption amount of nitrogen gas under a liquid nitrogen temperature (77K) using Belsorp-mino II of BEL Japan Co.

In the present specification, a "weight average molecular weight (Mw)" refers to a conversion value for a standard polystyrene measured by Gel Permeation Chromatography (GPC). Specifically, the weight average molecular weight is a value converted from a value measured under the conditions below using GPC, and a standard polystyrene of the Agilent system was used for making a calibration curve.

<Measurement Conditions>

Measurement device: Agilent GPC (Agulent 1200 series, USA)

Column: Two PL Mixed B connections

Eluent: tetrahydrofuran

Flow rate: 1.0 m/min

Concentration: ~1 mg/mL (100 μL injection)

Hereinafter, the present invention will be described in more detail.

Conductive Material Dispersion

First, a conductive material dispersion according to the present invention will be described.

The conductive material dispersion according to the present invention includes a carbon-based conductive material, a dispersant, and a dispersion medium. At this time, the dispersant includes a main dispersant and an auxiliary dispersant, and the main dispersant is a nitrile-based copolymer and the auxiliary dispersant is a copolymer including an oxyalkylene unit and at least one selected from the group consisting of a styrene unit and an aliphatic hydrocarbon unit.

Hereinafter, each component of the conductive material dispersion according to the present invention will be described in detail.

(1) Carbon-Based Conductive Material

The carbon-based conductive material is to improve the conductivity of an electrode, and a carbon-based conductive material commonly used in the art, for example, a carbon nanutube, carbon black, or the like, may be used.

In the carbon nanotube, a graphite sheet has a cylindrical shape of a nano-sized diameter and has an sp2 bonding structure, and exhibits conductor or semiconductor properties depending on the angle and structure at which the graphite surface is rolled. The carbon nanotube may be classified as a single-walled carbon nanotube (SWCNT), a double-walled carbon nanotube (DWCNT), and a multi-walled carbon nanotube (MWCNT) depending on the number of bonds forming a wall. Such a carbon nanotube may be appropriately selected according to the use of the dispersion.

In addition, the carbon nanotube may have a secondary shape in which a plurality of carbon nanotubes are aggregated or arranged. For example, the carbon nanotube may be a bundle-type carbon nanotube in the form of a bundle or a rope in which or a plurality of carbon nanotubes are arranged or aligned in parallel in a predetermined direction, or may be an entangled-type carbon nanonube in the form of a sphere or a potato in which a plurality of carbon nanotubes are entangled without a certain directionality. In terms of dispersibility, it is more preferable that the carbon nanotube is a bundle-type carbon nanonube.

Meanwhile, as the carbon black, commercially available furnace black, channel black, thermal black, acetylene black, ketjen black, hollow carbon black, or the like may be used. The type of the carbon nanonube is not particularly limited.

The carbon black may have been, as needed, surface-treated by a method known in the art. For example, the carbon black may have been surface-treated by acetylene gas, and thus, free of impurities. In addition, the carbon black may have a purity of 99.5% or greater.

Meanwhile, the carbon-based conductive material used in the present invention may have a BET specific surface area of 1000 $m^2/g$ or less, preferably 30 to 1000 $m^2/g$. When the BET specific surface area of the carbon-based conductive material is greater than 1000 $m^2/g$, dispersion may not be smoothly achieved.

Specifically, when the carbon-based conductive material is a carbon nanonube, the BET specific surface area of the carbon nanonube may be 100 to 1000 $m^2/g$, 150 to 800 $m^2/g$, 150 to 500 $m^2/g$, 150 to 300 $m^2/g$, or 150 to 200 $m^2/g$.

When the carbon-based conductive material is carbon black, the BET specific surface area of the carbon black may be 30 to 1000 $m^2/g$, preferably 30 to 400 $m^2/g$, more preferably 30 to 380 $m^2/g$, even more preferably 30 to 150 $m^2/g$.

Meanwhile, the content of the carbon-based conductive material in the conductive material dispersion may be 0.1 to 30 wt %, preferably 1 to 30 wt %. Specifically, when the carbon-based conductive material is a carbon nanonube, the content of the carbon-based conductive material in the conductive material dispersion may be 0.1 to 10 wt %, preferably 1 to 8 wt %, and when the carbon-based conductive material is carbon black, the content of the carbon-based conductive material in the conductive material dispersion may be 1 to 30 wt %, preferably 1 to 25 wt %. When the content of the carbon-based conductive material is too low, there may be problems in that a loading amount is reduced during the manufacturing of an electrode, so that process cost increases, and binder migration occurs during the manufacturing of the electrode, so that adhesion force is reduced. Meanwhile, when the content of the carbon-based conductive material is too high, there is a problem in that the viscosity of the conductive material dispersion increases.

(2) Dispersant

A conductive material dispersant according to the present invention two includes kinds of dispersants. Specifically, the conductive material dispersant according to the present invention includes a nitrile-based copolymer as a main dispersant and as an auxiliary dispersant, a copolymer including an oxyalkylene unit and at least one selected from the group consisting of a styrene unit and an aliphatic hydrocarbon unit.

2-1) Main Dispersant

The main dispersant is to improve the conductive material dispersibility in a conductive material dispersion, and may be, specifically, a copolymer having a α,β-unsaturated nitrile-derived unit and a conjugated diene-derived unit. At this time, the conjugated diene-derived unit may be partially or fully hydrogenated. A method for subjecting the conjugated diene-derived unit to hydrogenation may be performed by a hydrogenation method known in the art, for example, by a catalytic hydrogenation reaction using a catalyst system such as Rh, Ru, Pd, and IR, and the hydrogenation rate may be adjusted by adjusting the amount of catalyst, reaction hydrogen pressure, reaction time, and the like.

The nitrile-based copolymer may be prepared by copolymerizing an α,β-unsaturated nitrile monomer and a conjugated diene-based monomer, and then hydrogenating a C═C double bond in the copolymer. The polymerization reaction and hydrogenation process of the monomers may be performed according to a typical method known in the art.

As the α,β-unsaturated nitrile monomer, for example, acrylonitrile or methacrylonitrile may be used, and any one thereof or a mixture of two or more thereof may be used.

As the conjugated diene-based monomer, for example, conjugated diene-based monomers having 4 to 6 carbon atoms such as 1,3-butadiene, isoprene, 2,3-methyl butadiene, or the like may be used, and any one thereof or a mixture of two or more thereof may be used.

Meanwhile, the nitrile-based copolymer may include a α,β-unsaturated nitrile-derived unit: a conjugated diene-derived unit at a weight ratio of 10 to 50:50 to 90, preferably 20 to 40:60 to 80, and more preferably 25 to 40:60 to 75. When the content of each unit in the nitrile-based copolymer satisfies the above range, dispersibility and high-temperature properties are excellent. Here, the content of the α,β-unsaturated nitrile-derived unit may be the median value of a value to be quantified by measuring the amount of nitrogen generated in accordance with a mill oven method of JIS K 6364 and calculating its binding amount from the molecular weight of α,β-unsaturated nitrile. The content of the conjugated diene-derived unit may be a value obtained by subtracting the weight of the α,β-unsaturated nitrile-derived unit from the weight of all copolymers.

Meanwhile, the nitrile-based copolymer of the present invention may have a hydrogenation rate of the conjugated diene-derived unit of 80% or greater, preferably 90%. This is because, when dispersant a having unhydrogenated conjugated diene units is used, the reactivity with an electrolyte solution may increase due to double bonds in conjugated diene, so that high-temperature properties may deteriorate.

According to one embodiment, the nitrile-based copolymer may include a repeating unit represented by [Formula 1] below and a repeating unit represented by [Formula 2] below.

[Formula 1]

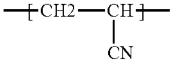

-continued

[Formula 2]

$$-[CH2-CH2-CH2-CH2]-$$

At this time, the content of the repeating unit represented by [Formula 1] above may be 10 to 50 wt %, preferably 20 to 40 wt %, and more preferably 25 to 40 wt %, and the content of the repeating unit represented by [Formula 2] above may be 50 to 90 wt %, preferably 60 to 80 wt %, and more preferably 60 to 75 wt %.

Meanwhile, the weight average molecular weight of the main dispersant may be 10,000 to 500,000 g/mol, preferably 20,000 to 400,000 g/mol, more preferably 20,000 to 300,000 g/mol, and yet more preferably 20,000 to 100,000 g/mol. When the weight average molecular weight of the main dispersant satisfies the above range, a conductive material may be uniformly dispersed with a small amount of dispersant, and the solution viscosity be prevented from being excessively increased when dispersing the conductive material, which is advantageous in processing.

2-2) Auxiliary Dispersant

The auxiliary dispersant is to improve the dispersibility of a conductive material by assisting the main dispersant, and is a copolymer including an oxyalkylene unit and a styrene unit and/or an alkylene unit.

The oxyalkylene unit may be represented by Formula 3 below.

[Formula 3]

$$*-[R_1-O]-*$$

In Formula 3 above, $R_1$ is an alkylene group having 1 to 20 carbon atoms, preferably an alkylene group having 2 to 10 carbon atoms, and more preferably an alkylene group having 2 to 5 carbon atoms.

The oxyalkylene unit may be included in an amount of 5 to 85 wt %, preferably 9 to 85 wt % based on the total weight of the copolymer. When the content of the oxyalkylene unit in the auxiliary dispersant copolymer is greater than 85 wt %, the effect of improving the viscosity of the conductive material dispersion is insignificant.

The styrene unit may be represented by Formula 4 below.

[Formula 4]

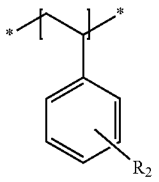

In Formula 4 above, $R_2$ may be hydrogen, halogen, an alkyl group having 1 to 10 carbon atoms, an alkoxy group having 1 to 10 carbon atoms, or a combination thereof.

The styrene unit may be included in an amount of 70 wt % or less, preferably 5 to 50 wt %, and more preferably 10 to 40 wt % based on the total weight of the copolymer. When the content of the styrene unit satisfies the above range, the effect of reducing the viscosity of the conductive material dispersion is more excellent.

The alkylene unit may be represented by [Formula 5] below.

[Formula 5]

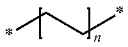

In Formula 5 above, n may be an integer of 1 to 50, preferably an integer of 3 to 30.

The alkylene unit may be included in an amount of 90 wt % or less, preferably 0 wt % to 85 wt %, and more preferably 15 to 60 wt % based on the total weight of the copolymer. When the content of the alkylene unit satisfies the above range, the effect of reducing the viscosity of the conductive material dispersion is more excellent.

Specifically, the auxiliary dispersant copolymer according to the present invention may be a copolymer including an oxyalkylene unit and a styrene unit, a copolymer including an oxyalkylene unit and an alkylene unit, or a copolymer including an oxyalkylene unit, a styrene unit, and an alkylene unit.

According to the research of the present inventors, when a copolymer including the above-described combination of specific units is used together with a nitrile-based copolymer which is a main dispersant, compared to a case in which a nitrile-based copolymer is used alone or a case in which a different type of auxiliary dispersant is used with a nitrile-based copolymer, the viscosity of a conductive material dispersion is significantly reduced.

Meanwhile, the above-described auxiliary dispersant copolymer of the invention may be prepared by a copolymer preparation method well known in the art. For example, the auxiliary dispersant copolymer may be prepared by polymerizing compounds capable of inducing each of the units, or may be prepared by reacting a compound including each of the units through an acid-base reaction and the like.

A compound capable of inducing an oxyalkylene unit may be, for example, polyalkylene glycol such as polyethylene glycol and polypropylene glycol, or an alkylene oxide-based compound such as a (poly)ethylene oxide and a (poly) propylene oxide, but is not limited thereto.

A compound capable of inducing a styrene unit may be, for example, styrene, α-methyl styrene, vinyltoluene, chloromethylstyrene, chlorostyrene, bromostyrene, vinylbenzensulfonate, methoxymethylstyrene, benzyl (meth)acrylate, and the like, but is not limited thereto.

A compound capable of inducing an alkylene unit may be, for example, an alkyl (meth)acrylate monomer, an alkene monomer, and the like. Examples of the alkyl (meth)acrylate monomer may include methyl (meth)acrylate, propyl (meth) acrylate, isopropyl (meth)acrylate, n-butyl (meth)acrylate, isobutyl (meth)acrylate, n-amyl (meth)acrylate, isoamyl (meth)acrylate, 2-ethylhexyl (meth)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth)acrylate, octadecyl (meth)acrylate, isobornyl (meth)acrylate, and the like, but are not limited thereto.

Examples of the alkene monomer may include propene, butene, pentene, hexene, heptene, octene, nonene, decene, dodecene, tridecene, tetradecene, octadecene, and the like, but are not limited thereto.

Meanwhile, as a compound including each of the units, for example, polyalkylene glycol, a polyalkylene-styrene copolymer, a styrene-maleic anhydride copolymer, polyalkylene imine, a surfactant including oxyalkylene and/or alkylene units, and the like may be used, but the present invention is not limited thereto.

Meanwhile, the weight average molecular weight of the auxiliary dispersant may be 800 to 50,000 g/mol, preferably 800 to 30,000 g/mol. When the weight average molecular weight of the auxiliary dispersant satisfies the above range, the effect of reducing the viscosity of the conductive material dispersion is excellent.

Meanwhile, in the conductive material dispersion of the present invention, the main dispersant and the auxiliary dispersant may be included at a weight ratio of 30:70 to 90:10, preferably 50:50 to 90:10, and more preferably 60:40 to 90:10. When the content of the main dispersant is less than the above range, the dispersion of a conductive material is not smoothly achieved, so that the viscosity improvement effect is insignificant. In addition, when the ratio of the main dispersant of all dispersants is 50% or greater, the viscosity improvement effect is more excellent.

(3) Dispersion Medium

The dispersion medium may be an organic solvent including any one thereof or two or more hetero atoms selected from the group consisting of a nitrogen atom (N) and an oxygen atom (O) having an unshared electron pair.

Specifically, the dispersion medium may be an amide-based polar organic solvent such as dimethylformamide (DMF), diethylformamide, dimethylacetamide (DMAc) and N-methylpyrrolidone (NMP); an alcohol such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol and octanol; a glycol such as ethylene glycol, diethylene glycol, triethylene glycol, propylene glycol, 1,3-propanediol, 1,3-butanediol, 1,5-pentanediol, and hexylene glycol; a polyhydric alcohol such as glycerin, trimethylol propane, pentaerythritol, and sorbitol; a glycol ether such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether; a ketone such acetone, methyl ethyl ketone, methyl propyl ketone, and cyclopentanone; an ester such as ethyl acetate, γ-butyl lactone, and ε-propiactone. Any one thereof or a mixture of two or more thereof may be used. When considering the miscibility with an electrode slurry, N-methylpyrrolidone (NMP) is particularly preferable among the above.

The conductive material dispersion of the present invention including the above components may be prepared by mixing a carbon-based conductive material, a main dispersant, an auxiliary dispersant, and a dispersion medium. At this time, the mixing may be performed by a typical mixing method, specifically, by using a mixing device such as a homogenizer, a beads mill, a ball mill, a basket mill, an attrition mill, an all-purpose stirrer, a clear mixer, a spike mill, a TK mixer, or the like. The mixing order of each component is not particularly limited. That is, the conductive material dispersion of the present invention may be prepared by adding a carbon-based conductive material to a dispersion medium, and then adding a main dispersant and an auxiliary dispersant thereto, followed by mixing, prepared by first adding a main dispersant and an auxiliary dispersant to a dispersion medium, and then mixing a carbon-based conductive material therewith, or prepared by adding a main dispersant, an auxiliary dispersant, and a carbon-based conductive material to a dispersion medium, followed by mixing.

Meanwhile, in the above mixing process, cavitation dispersion processing may be performed in order to increase the dispersibility of the carbon-based conductive material. The cavitation dispersion processing is a dispersion processing method using shock waves generated by the rupture of vacuum bubbles formed in water when high energy is applied to a liquid. According to the method, dispersion may be achieved without damaging the properties of the carbon-based conductive material. Specifically, the cavitation dispersion processing may be performed by ultrasound, a jet mill, or a shear dispersion processing.

Meanwhile, the dispersibility of a conductive material is affected by the type and specific surface area of a conductive material used, and thus, it is necessary to appropriately adjust the content of the conductive material and of a dispersant according to a specific surface area value of the conductive material used in order to obtain an excellent viscosity reduction effect. Therefore, the present inventors have repeatedly conducted research and have discovered that when the specific surface area of a conductive material and the content of each component satisfy a specific relationship represented by Equation (1) below, a viscosity reduction effect may be obtained.

Specifically, it is preferable that the conductive material dispersion according to the present invention is configured such that the specific surface area of a conductive material and the content of the conductive material and dispersants in the conductive material dispersion satisfy Equation (1) below.

$$0.07A \leq \{W1 + W2) / W3\} \times 100 \leq 0.3A \qquad \text{Equation (1)}$$

At this time, in Equation (1) above, W1 represents wt % of a main dispersant in a conductive material dispersion, W2 represents a wt % of an auxiliary dispersant in the conductive material dispersion, W3 represents wt % of a conductive material in the conductive material dispersion, and A is a BET specific surface area (unit: $m^2/g$) value of the conductive material used.

When the conductive material dispersion satisfies Equation (1) above, the conductive material may be sufficiently wetted, so that the effect of reducing the viscosity of the conductive material dispersion may be maximized.

According to one embodiment, the conductive material dispersion according to the present invention may include a nitrile-based copolymer having a weight average molecular weight of 10,000 to 100,000 g/mol as a main dispersant, a copolymer having an oxyalkylene unit, a styrene unit, and an alkylene unit as an auxiliary dispersant, and a carbon nanotube having a BET specific surface area of 150 to 200 $m^2/g$ as a carbon-based conductive material. When the main dispersant, the auxiliary dispersant, and the carbon-based conductive material satisfy the above combination, the effect of reducing viscosity is excellent.

Electrode

Next, an electrode according to the present invention will be described.

The electrode according to the present invention includes an electrode active material layer formed of an electrode slurry composition containing an electrode active material, a conductive material dispersion, and a binder. Specifically, the electrode includes an electrode current collector and an electrode active material layer formed on the electrode current collector, wherein the electrode active material layer may be formed by an electrode slurry composition containing an electrode active material, a conductive material dispersion, and a binder.

At this time, the conductive material dispersion is the conductive material dispersion according to the present invention described above. The description of the conductive material dispersion is the same as that described above, and thus, a detailed description thereof will be omitted. Hereinafter, only the rest of the components will be described.

The electrode current collector is not particularly limited as long as it has conductivity without causing a chemical change in a battery. For example, copper, stainless steel, aluminum, nickel, titanium, an alloy thereof, copper, stainless steel, aluminum, nickel or titanium that is surface-treated with one of carbon, nickel, titanium, silver and the like, fired carbon, or the like may be used.

The electrode collector may typically have a thickness of 3 μm to 500 μm, and microscopic irregularities may be formed on the surface of the electrode current collector to improve the adhesion of a negative electrode active material. In addition, the electrode current collector may be used in various forms such as a film, a sheet, a foil, a net, a porous body, a foam, and a non-woven body.

Meanwhile, the electrode active material (a) included in the electrode active material layer may be a positive electrode active material or a negative electrode active material commonly used in the art, and the type thereof is not particularly limited.

For example, as a positive electrode active material, a lithium oxide containing one or more metals such as cobalt, manganese, nickel or aluminum, and lithium may be used. More specifically, the lithium oxide may be a lithium-manganese-based oxide (e.g., $LiMnO_2$, $LiMn_2O$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein $0<Y1<1$), $LiNi_{Z1}Mn_{2-Z1}O_4$ (wherein $0<Z1<2$), etc.), a lithium-nickel-cobalt-based oxide (e.g., $LiNi_{1-Y2}CO_{Y2}O_2$ (wherein $0<Y2<1$), etc.), a lithium-manganese-cobalt-based oxide (e.g., $LiCo_{1-Y3}Mn_{Y3}O_2$ (wherein $0<Y3<1$), $LiMn_{2-Z2}CO_{Z2}O_4$ (wherein $0<Z2<2$, etc.), a lithium-nickel-cobalt-manganese-based oxide (e.g., $Li(Ni_{P1}CO_{Q1}Mn_{R1})O_2$ (wherein $0<P1<1$, $0<Q1<1$, $0<R1<1$, $P1+Q1+R1=1$) or $Li(Ni_{P2}CO_{Q2}Mn_{R2})O_4$ (wherein $0<P2<2$, $0<Q2<2$, $<R2<2$, $P2+Q2+R2=2$), etc.), or a lithium-nickel-cobalt-manganese-other metal (M) oxide (e.g., $Li(Ni_{P3}CO_{Q3}Mn_{R3}M^1{}_S)O2$ (wherein $M^1$ is selected from the group consisting of Al, Cu, Fe, V, Cr, Ti, Zr, Zn, Ta, Nb, Mg, B, W and Mo, and P3, Q3, R3, and S are each an atomic fraction of independent elements, and $0<P3<1$, $0<Q3<1$, $0<R3<1$, $0<S<1$, $P3+Q3+R3+S=1$), etc.) and the like, and any one thereof or a compound of two or more thereof may be included.

Meanwhile, a negative electrode active material may be a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, and an Sn alloy or an Al alloy; a metal oxide which may be doped and undoped with lithium such as $SiO_v$ ($0<v<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material.

The electrode active material may be included in an amount of 70 to 99 wt %, preferably 80 to 98 wt %, based on the total solid content in the electrode slurry composition. When the content of the positive electrode active material satisfies the above range, excellent energy density, electrode adhesion force, and electrical conductivity may be implemented.

The binder is to ensure the adhesion force between electrode active materials or between an electrode active material and a current collector. Any binder commonly used in the art may be used, and the type thereof is not particularly limited. The binder may be, for example, polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated-EPDM, styrene-butadiene rubber (SBR), fluorine rubber, or various copolymers thereof, and the like, and any one thereof or a mixture of two or more thereof may be used.

The binder may be included in an amount of 5 wt % or less based on the total solid content in the electrode slurry composition, and may preferably be included in an amount of 1 to 3 wt %. When the content of binder satisfies the above range, it is possible to implement excellent electrode adhesion force while minimizing the increase in electrode resistance.

Meanwhile, the electrode slurry composition may further include a solvent, if necessary, to control viscosity and the like. At this time, the solvent may be water, an organic solvent, or a mixture thereof. The organic solvent may be, for example, an amide-based polar organic solvent such as dimethyl formamide (DMF), diethylformamide, dimethylacetamide (DMAc), and N-methylpyrrolidone (NMP); an alcohol such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, and octanol; a glycol such as ethylene glycol, diethylene glycol, triethylene glycol, propylene glycol, 1,3-propanediol, 1,3-butanediol, 1,5-pentanediol, and hexylene glycol; a polyhydric alcohol such as glycerin, trimethylol propane, pentaerythritol, and sorbitol; a glycol ether such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether; a ketone such acetone, methyl ethyl ketone, methyl propyl ketone, and cyclopentanone; and an ester such as ethyl acetate, γ-butyl lactone, and ε-propiactone. Any one thereof and a mixture of two or more thereof may be used, but the organic solvent is not limited thereto.

The solvent may be included in a content such that the solid content in an electrode slurry becomes 60 to 85 wt %, preferably 65 to 80 wt %. When the solid content of the electrode slurry is less than 60 wt %, an electrode loading amount may be reduced, thereby increasing process cost, binder migration may occur, thereby degrading electrode adhesion force, and coating defects may be generated. Meanwhile, when the solid content of the electrode slurry is greater than 85 wt %, the viscosity of the electrode slurry becomes too high, so that processability may be deteriorated and coating defects may be generated.

The electrode according to the present invention may be manufactured by forming an electrode active material layer by applying an electrode slurry composition including the above components, followed by drying. Specifically, the electrode active material layer may be formed by a method in which an electrode slurry is applied on an electrode current collector and then dried, or by a method in which an electrode slurry is applied on a separate support, and then laminating a film obtained by being peeled off from the support on an electrode current collector. If necessary, after forming an electrode active material layer through the above method, a process of roll-pressing the same may be additionally performed. At this time, drying and roll-pressing may be performed under appropriate conditions in consideration of the physical properties of an electrode to be finally manufactured, and are not particularly limited.

Lithium Secondary Battery

Next, a secondary battery according to the present invention will be described.

The secondary battery according to the present invention includes the electrode of the present invention described above. At this time, the electrode may be at least one among a positive electrode and a negative electrode. Specifically, the secondary battery according to the present invention may include a positive electrode, a negative electrode, a separator interposed between the positive electrode and the negative electrode, and an electrolyte. At this time, at least one among the positive electrode and the negative electrode may be the electrode of the present invention described above. Preferably, the electrode of the present invention may be a positive electrode.

Since the electrode according to the present invention has been described above, a detailed description thereof will be omitted. Hereinafter, only the rest of the components will be described.

The separator is to separate the negative electrode and the positive electrode and to provide a movement path for lithium ions. Any separator may be used without particular limitation as long as it is a separator typically used in a lithium secondary battery. Specifically, as the separator, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, a cyclic carbonate such as ethylene carbonate and propylene carbonate may preferably be used since it is an organic solvent of high viscosity and has high dielectric constant to dissociate a lithium salt well. Such a cyclic carbonate may be more preferably used since when it is mixed with a linear carbonate of low viscosity and low dielectric constant such as dimethyl carbonate and diethyl carbonate in an appropriate ratio, an electrolyte having a high electric conductivity is prepared.

As the metal salt, a lithium salt may be used. The lithium salt is a material which is easily dissolved in the non-aqueous electrolyte solution. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, and the like may be further included other than the above electrolyte components.

MODE FOR CARRYING OUT THE INVENTION

Hereinafter, Examples of the present invention will be described in detail so that those skilled in the art may easily carry out the present invention. However, the present invention may be embodied in many different forms, and is not limited to Examples set forth herein.

Specifications of each component used in the following Examples and Comparative Examples are as follows.

(A) Main Dispersant (A1) Hydrogenated acrylonitrile-butadiene rubber (H-NBR) having a weight average molecular weight of 260,000 g/mol (the weight ratio of acrylonitrile:hydrogenated butadiene=34:66) was used.

(A2) Hydrogenated acrylonitrile-butadiene rubber (H-NBR) having a weight average molecular weight of 34,000 g/mol (the weight ratio of acrylonitrile:hydrogenated butadiene=34:66) was used.

(B) Auxiliary Dispersant

As an auxiliary dispersant, a copolymer of each of the following (B1) to (B24) was used, and the weight ratio of an oxyalkylene unit, a styrene unit, an alkylene unit and other units in the copolymer of each of the following (B1) to (B24) and the weight average molecular weight of the copolymers are as described in Table 1 below. At this time, the content of each unit in the copolymers was measured through Nuclear Magnetic Resonance (NMR).

(B1) Ethomeen 18/25 of Akzonobel Co., Ltd. was used.

(B2) A copolymer of polyethylene glycol and styrene (weight ratio of oxyalkylene unit:styrene unit=71.8:28.2, weight average molecular weight: 1,250 g/mol) was used.

(B3) A copolymer prepared by mixing 10 g of polyethylene imine (Manufacturer Sigma-Aldrich, molecular weight 1800 g/mol) and 10 g of AKYPO RO90 (Oleth-10 carboxylic acid, Manufacturer KAO chemicals) with 20 g of NMP and then reacting the mixture at 80° C. for 20 hours was used.

(B4) A copolymer prepared by mixing 10 g of polyethylene imine (Manufacturer Sigma-Aldrich, molecular weight 1800 g/mol) and 6.6 g of AKYPO RO90 (Oleth-10 carboxylic acid, Manufacturer KAO chemicals) with 20 g of NMP and then reacting the mixture at 80° C. for 20 hours was used.

(B5) A copolymer prepared by mixing 10 g of polyethylene imine (Manufacturer Sigma-Aldrich, molecular weight 1800 g/mol) and 3.3 g of AKYPO RO90 (Oleth-10 carboxylic acid, Manufacturer KAO chemicals) with 20 g of NMP and then reacting the mixture at 80° C. for 20 hours was used.

(B6) A styrene-maleic anhydride copolymer (Sigma-Aldrich Co. Ltd., poly(styrene-co-maleic anhydride)), weight ratio of styrene unit:maleic anhydride unit=75:25, weight average molecular weight: 1,900 g/mol) was used.

(B7) A copolymer prepared by dissolving 10 g of a styrene-maleic anhydride copolymer (Sigma-Aldrich Co. Ltd., poly(styrene-co-maleic anhydride)), weight ratio of styrene unit:maleic anhydride unit=75:25, weight average molecular weight: 1,900 g/mol) in 112.4 g of NMP, followed by adding 0.459 g of water thereto and mixing the same at 80° C. for 10 minutes, and then adding 18.2 g of Ethomeen O/12 of Akzonobel Co., Ltd. thereto and reacting the mixture at 80° C. for 20 hours was used.

(B8) A copolymer prepared by dissolving 5 g of a styrene-maleic anhydride copolymer (Sigma-Aldrich Co. Ltd., poly (styrene-co-maleic anhydride)), weight ratio of styrene unit: maleic anhydride unit=75:25, weight average molecular weight: 1,900 g/mol) in 114.6 g of NMP, followed by adding 0.23 g of water thereto and mixing the same at 80° C. for 10 minutes, and then adding 23.7 g of Ethomeen O/12 of Akzonobel Co., Ltd. thereto and reacting the mixture at 80° C. for 20 hours was used.

(B9) A copolymer prepared by dissolving 10 g of a styrene-maleic anhydride copolymer (Sigma-Aldrich Co. Ltd., poly(styrene-co-maleic anhydride)), weight ratio of styrene unit:maleic anhydride unit=75:25, weight average molecular weight: 1,900 g/mol) in 125.1 g of NMP, followed by adding 0.45 g of water thereto and mixing the same at 80° C. for 10 minutes, and then adding 21.4 g of Ethomeen C/15 of Akzonobel Co., Ltd. thereto and reacting the mixture at 80° C. for 20 hours was used.

(B10) A copolymer prepared by dissolving 5 g of a styrene-maleic anhydride copolymer (Sigma-Aldrich Co. Ltd., poly(styrene-co-maleic anhydride)), weight ratio of styrene unit:maleic anhydride unit=75:25, weight average molecular weight: 1,900 g/mol) in 107.4 g of NMP, followed by adding 0.23 g of water thereto and mixing the same at 80° C. for 10 minutes, and then adding 21.9 g of Ethomeen C/25 of Akzonobel Co., Ltd. thereto and reacting the mixture at 80° C. for 20 hours was used.

(B11) A copolymer prepared by dissolving 5 g of a styrene-maleic anhydride copolymer (Sigma-Aldrich Co.

Ltd., poly(styrene-co-maleic anhydride)), weight ratio of styrene unit:maleic anhydride unit=75:25, weight average molecular weight: 1,900 g/mol) in 113.1 g of NMP, followed by adding 0.23 g of water thereto and mixing the same at 80° C. for 10 minutes, and then adding 21.9 g of Ethomeen T/25 of Akzonobel Co., Ltd. thereto and reacting the mixture at 80° C. for 20 hours was used.

(B12) A copolymer prepared by dissolving 7 g of a styrene-maleic anhydride copolymer (Sigma-Aldrich Co. Ltd., poly(styrene-co-maleic anhydride)), molar ratio of styrene unit:maleic anhydride unit=1.3:1, weight average molecular weight: 1,600 g/mol) in 113.2 g of NMP, followed by adding 0.54 g of water thereto and mixing the same at 80° C. for 10 minutes, and then adding 21.4 g of Ethomeen O/12 of Akzonobel Co., Ltd. thereto and reacting the mixture at 80° C. for 20 hours was used.

(B13) A copolymer prepared by dissolving 4 g of a styrene-maleic anhydride copolymer (Sigma-Aldrich Co. Ltd., poly(styrene-co-maleic anhydride)), molar ratio of styrene unit:maleic anhydride unit=1.3:1, weight average molecular weight: 1,600 g/mol) in 143.2 g of NMP, followed by adding 0.309 g of water thereto and mixing the same at 80° C. for 10 minutes, and then adding 31.9 g of Ethomeen 18/25 of Akzonobel Co., Ltd. thereto and reacting the mixture at 80° C. for 20 hours was used.

(B14) A copolymer prepared by dissolving 7 g of a styrene-maleic anhydride copolymer (Sigma-Aldrich Co. Ltd., poly(styrene-co-maleic anhydride)), molar ratio of styrene unit:maleic anhydride unit=1.3:1, weight average molecular weight: 1,600 g/mol) in 128.1 g of NMP, followed by adding 0.54 g of water thereto and mixing the same at 80° C. for 10 minutes, and then adding 25.2 g of Ethomeen C/15 of Akzonobel Co., Ltd. thereto and reacting the mixture at 80° C. for 20 hours was used.

(B15) A copolymer prepared by dissolving 4 g of a styrene-maleic anhydride copolymer (Sigma-Aldrich Co. Ltd., poly(styrene-co-maleic anhydride)), molar ratio of styrene unit:maleic anhydride unit=1.3:1, weight average molecular weight: 1,600 g/mol) in 133.6 g of NMP, followed by adding 0.309 g of water thereto and mixing the same at 80° C. for 10 minutes, and then adding 5 g of Ethomeen C/25 of Akzonobel Co., Ltd. thereto and reacting the mixture at 80° C. for 20 hours was used.

(B16) A copolymer prepared by dissolving 4 g of a styrene-maleic anhydride copolymer (Sigma-Aldrich Co. Ltd., poly(styrene-co-maleic anhydride)), molar ratio of styrene unit:maleic anhydride unit=1.3:1, weight average molecular weight: 1,600 g/mol) in 141.2 g of NMP, followed by adding 0.309 g of water thereto and mixing the same at 80° C. for 10 minutes, and then adding 31.4 g of Ethomeen T/25 of Akzonobel Co., Ltd. thereto and reacting the mixture at 80° C. for 20 hours was used.

(B17) 8 g of a styrene monomer, 12.08 g of dimethylaminoethyl methacrylate, and 2.9 g of NMP were mixed to a 100 mL flask and nitrogen bubbling was performed on the mixture for 10 minutes. In addition, bubbling was performed on azobisisobutyronitrile (AIBN) dissolved to 10 wt % in NMP to extract 21.02 g of the azobisisobutyronitrile, and then the extracted azobisisobutyronitrile was added to the flask, followed by heating and mixing at 90° C. to perform a polymerization reaction for 5 hours to prepare a polymerization solution. A copolymer prepared by mixing 1 g of the polymerization solution and 1.55 g of AKYPO RO20 (Olethcarboxylic acid, Manufacturerer KAO chemicals) and then reacting the mixture at 80° C. for 20 hours was used.

(B18) A copolymer prepared by mixing 1 g of the polymerization solution prepared in (B17) and 2.04 g of AKYPO RO50 (Olethcarboxylic acid, Manufacturer KAO chemicals) and then reacting the mixture at 80° C. for 20 hours was used.

(B19) A copolymer prepared by mixing 2 g of the polymerization solution prepared in (B17) and 1.64 g of AKYPO RO50 (Olethcarboxylic acid, Manufacturer KAO chemicals) and then reacting the mixture at 80° C. for 20 hours was used.

(B20) A copolymer prepared by mixing 2 g of the polymerization solution prepared in (B17) and 1.65 g of AKYPO RO20 (Olethcarboxylic acid, Manufacturer KAO chemicals) and then reacting the mixture at 80° C. for 20 hours was used.

(B21) A polystyrene polymer (Sigma-Aldrich Co. Ltd., weight average molecular weight: 35.00 g/mol) was used.

(B22) 5.27 g of a styrene monomer, 19.97 g of dimethylaminoethyl methacrylate, and 24.82 g of NMP were mixed to a 100 mL flask and nitrogen bubbling was performed on the mixture for 10 minutes. In addition, bubbling was performed on azobisisobutyronitrile (AIBN) dissolved to 10 wt % in NMP to extract 0.52 g of the azobisisobutyronitrile, and then the extracted azobisisobutyronitrile was added to the flask, followed by heating and mixing at 90° C. to perform a polymerization reaction for 5 hours to prepare a copolymer. The copolymer prepared as described above was used.

(B23) 8 g of a styrene monomer, 12.08 g of dimethylaminoethyl methacrylate, and 2.9 g of NMP were mixed to a 100 mL flask and nitrogen bubbling was performed on the mixture for 10 minutes. In addition, bubbling was performed on azobisisobutyronitrile (AIBN) dissolved to 10 wt % in NMP to extract 21.02 g of the azobisisobutyronitrile, and then the extracted azobisisobutyronitrile was added to the flask, followed by heating and mixing at 90° C. to perform a polymerization reaction for 5 hours to prepare a copolymer. The copolymer prepared as described above was used.

(B24) A copolymer prepared by dissolving 5 g of a polyacrylic acid (Wako pure chemical Co., Ltd., molecular weight 1,800 g/mol) in 94.3 g of NMP and then adding 18.6 g oleylamine (Sigma-Aldrich Co., Ltd.) thereto, followed by reacting the mixture at 80° C. for 20 hours was used.

TABLE 1

| Auxiliary dispersant | Composition (weight ratio) | | | | Weight average molecular weight (Mw, g/mol) |
|---|---|---|---|---|---|
| | Oxyalkylene | Styrene | Alkylene | Others | |
| B1 | 73.6 | 0 | 25.4 | 0 | 960 |
| B2 | 71.8 | 28.2 | 0 | 0 | 1,250 |
| B3 | 32.6 | 0 | 67.4 | 0 | 3,500 |
| B4 | 25.9 | 0 | 74.1 | 0 | 2,990 |
| B5 | 16.2 | 0 | 83.8 | 0 | 2,390 |
| B6 | 0 | 75 | 0 | 25 | 1,900 |
| B7 | 15.7 | 26.2 | 48 | 10.1 | 5,450 |
| B8 | 57.9 | 13 | 24.1 | 5 | 11,000 |
| B9 | 35.3 | 23.6 | 32 | 9.1 | 6,050 |
| B10 | 61.8 | 13.8 | 19 | 5.4 | 10,310 |
| B11 | 58.9 | 13.1 | 22.9 | 5.1 | 10,860 |
| B12 | 18.3 | 15 | 55.9 | 11.8 | 6,620 |
| B13 | 62.6 | 6.4 | 25.6 | 5.4 | 14,470 |
| B14 | 40.4 | 12.4 | 36.7 | 10.5 | 7,470 |
| B15 | 67 | 6.9 | 20.3 | 5.8 | 13,510 |
| B16 | 63.4 | 6.5 | 24.6 | 5.5 | 14,280 |
| B17 | 12.9 | 15.3 | 47.9 | 23.9 | 8,170 |
| B18 | 27.1 | 12.8 | 40.1 | 20 | 9,760 |
| B19 | 18.1 | 21.5 | 26.8 | 33.6 | 5,380 |

TABLE 1-continued

| Auxiliary dispersant | Composition (weight ratio) Oxyalkylene | Styrene | Alkylene | Others | Weight average molecular weight (Mw, g/mol) |
|---|---|---|---|---|---|
| B20 | 9.6 | 21.3 | 35.7 | 33.4 | 5,850 |
| B21 | 0 | 100 | 0 | 0 | 35,000 |
| B22 | 0 | 20.5 | 0 | 79.5 | 4,040 |
| B23 | 0 | 39 | 0 | 61 | 3,200 |
| B24 | 0 | 31.1 | 53.1 | 15.8 | 4,580 |

(C) Conductive Material (C1) A carbon nanonube (CNT, Manufacturer: LG Chem) having a BET specific surface area of 185 $m^2/g$ was used.

C2) A carbon nanonube (CNT, Manufacturer: LG Chem) having a BET specific surface area of 250 m2/g was used.

(C3) Carbon black (Manufacturer: DENKA) having a BET specific surface area of 130 $m^2/g$ was used.

Examples 1 to 34

In a 1 L container, components listed in Table 2 below were added to N-methyl pyrrolidone as a main dispersant (A), an auxiliary dispersant (B), and a conductive material (C) to the wt % described in [Table 2] below to prepare 500 g of a mixed solution. Thereafter, the mixed solution was mixed at 5,000 rpm for 60 minutes using a saw type impeller (VMA-GETZMANN Co., Ltd., DISPERMAT CN20) having a diameter of 80 mm, and then subjected to milling for 60 minutes using a bead mill (Netzsch Co., Ltd., Mini-Cer) filled with 500 g of 1 mm zirconia beads.

Comparative Examples 1 to 5

In a 1 L container, components listed in Table 3 below were added to N-methyl pyrrolidone as a main dispersant (A), an auxiliary dispersant (B), and a conductive material (C) to the wt % described in [Table 3] below to prepare 500 g of a mixed solution. Thereafter, the mixed solution was mixed at 5,000 rpm for 60 minutes using a saw type impeller (VMA-GETZMANN Co., Ltd., DISPERMAT CN20) having a diameter of 80 mm, and then subjected to milling for 60 minutes using a bead mill (Netzsch Co., Ltd., Mini-Cer) filled with 500 g of 1 mm zirconia beads.

The viscosity of the conductive material dispersion prepared in each of Examples and Comparative Examples was measured at 25° C. and 1 rpm using a viscometer (TOKI Co., Ltd., viscometer TV-22), and then according to Equation (2) below, the viscosity reduction rate with respect to a reference solution was measured.

$$\text{Viscosity reduction rate}(\%) = \{(\text{Viscosity of reference solution} - \text{Viscosity of conductive material dispersion})/\text{Viscosity of reference solution}\} \times 100 \quad \text{Equation (2)}$$

In Equation (2) above, as the reference solution, different solutions were used depending on the type of conductive material used in the preparation of a conductive material dispersion.

Specifically, when measuring the viscosity reduction rate of a conductive material dispersion in which a (C1) component was used as a conductive material, a solution in which 3.77 wt % of a conductive material (C1) and 0.76 wt % of a main dispersant (A1) were mixed in N-methyl pyrrolidone was used as a reference solution, and the viscosity of the reference solution was 17.09 Pa·s.

When measuring the viscosity reduction rate of a conductive material dispersion in which a (C2) component was used as a conductive material, a solution in which 1.85 wt % of a conductive material (C2) and 0.37 wt % of a main dispersant (A1) were mixed in N-methyl pyrrolidone was used as a reference solution, and the viscosity of the reference solution was 8.61 Pa·s.

When measuring the viscosity reduction rate of a conductive material dispersion in which a (C3) component was used as a conductive material, a solution in which 14.45 wt % of a conductive material (C3) and 1.45 wt % of a main dispersant (A1) were mixed in N-methyl pyrrolidone was used as a reference solution, and the viscosity of the reference solution was 6.36 Pa·s.

The measurement results are shown in [Table 2] and [Table 3] below.

TABLE 2

| | (A) Main dispersant | | (B) Auxiliary dispersant | | (C) Conductive material | | Viscosity reduction |
|---|---|---|---|---|---|---|---|
| | Type | Content (wt %) | Type | Content (wt %) | Type | Content (wt % ) | rate (%) |
| Example 1 | A1 | 0.76 | B1 | 0.38 | C1 | 3.81 | 26.3 |
| Example 2 | A1 | 0.76 | B2 | 0.38 | C1 | 3.81 | 30.0 |
| Example 3 | A1 | 0.76 | B3 | 0.38 | C1 | 3.81 | 27.8 |
| Example 4 | A1 | 0.76 | B4 | 0.38 | C1 | 3.81 | 23.7 |
| Example 5 | A1 | 0.76 | B5 | 0.38 | C1 | 3.81 | 25.4 |
| Example 6 | A1 | 0.76 | B1 | 0.31 | C1 | 3.81 | 34.1 |
| | | | B6 | 0.07 | | | |
| Example 7 | A1 | 0.76 | B7 | 0.38 | C1 | 3.81 | 48.4 |
| Example 8 | A1 | 0.76 | B8 | 0.38 | C1 | 3.81 | 42.6 |
| Example 9 | A1 | 0.76 | B9 | 0.38 | C1 | 3.81 | 42.9 |
| Example 10 | A1 | 0.76 | B10 | 0.38 | C1 | 3.81 | 41.7 |
| Example 11 | A1 | 0.76 | B11 | 0.38 | C1 | 3.81 | 41.2 |
| Example 12 | A1 | 0.76 | B12 | 0.38 | C1 | 3.81 | 45.1 |
| Example 13 | A1 | 0.76 | B13 | 0.38 | C1 | 3.81 | 41.7 |
| Example 14 | A1 | 0.76 | B14 | 0.38 | C1 | 3.81 | 45.1 |
| Example 15 | A1 | 0.76 | B15 | 0.38 | C1 | 3.81 | 38.2 |
| Example 16 | A1 | 0.76 | B16 | 0.38 | C1 | 3.81 | 40.9 |
| Example 17 | A1 | 0.76 | B17 | 0.38 | C1 | 3.81 | 28.2 |
| Example 18 | A1 | 0.76 | B18 | 0.38 | C1 | 3.81 | 32.0 |
| Example 19 | A1 | 0.76 | B19 | 0.38 | C1 | 3.81 | 29.3 |
| Example 20 | A1 | 0.76 | B20 | 0.38 | C1 | 3.81 | 25.9 |
| Example 21 | A1 | 0.76 | B2 | 0.19 | C1 | 3.81 | 21.1 |
| | | | B27 | 0.19 | | | |
| Example 22 | A2 | 0.71 | B7 | 0.24 | C1 | 4.72 | 57.3 |
| Example 23 | A2 | 0.53 | B7 | 0.18 | C1 | 4.72 | 37.6 |
| Example 24 | A2 | 0.89 | B7 | 0.3 | C1 | 4.72 | 81.4 |
| Example 25 | A2 | 1.07 | B7 | 0.36 | C1 | 4.73 | 85.8 |
| Example 26 | A2 | 1.76 | B7 | 0.59 | C1 | 4.7 | 89.7 |
| Example 27 | A2 | 0.57 | B7 | 0.19 | C1 | 3.78 | 97.6 |
| Example 28 | A2 | 0.37 | B7 | 0.37 | C1 | 3.74 | 97.7 |
| Example 29 | A2 | 0.94 | B7 | 0.19 | C1 | 3.74 | 45.9 |
| Example 30 | A2 | 0.28 | B7 | 0.09 | C2 | 1.86 | 40.8 |
| Example 31 | A2 | 0.35 | B7 | 0.12 | C2 | 1.86 | 56.1 |
| Example 32 | A2 | 0.42 | B7 | 0.14 | C2 | 1.87 | 65.4 |
| Example 33 | A2 | 0.7 | B7 | 0.23 | C2 | 1.86 | 86.9 |
| Example 34 | A2 | 1.05 | B7 | 0.35 | C3 | 13.95 | 84.3 |

TABLE 3

| | (A) Main dispersant | | (B) Auxiliary dispersant | | (C) Conductive material | | Viscosity reduction |
|---|---|---|---|---|---|---|---|
| | Type | Content (wt %) | Type | Content (wt %) | Type | Content (wt %) | rate (%) |
| Comparative Example 1 | A1 | 0.76 | B21 | 0.38 | C1 | 3.81 | −19.2 |
| Comparative Example 2 | A1 | 0.76 | B6 | 0.38 | C1 | 3.81 | −11.2 |
| Comparative Example 3 | A1 | 0.76 | B22 | 0.38 | C1 | 3.81 | −3.2 |
| Comparative Example 4 | A1 | 0.76 | B23 | 0.38 | C1 | 3.81 | −17.2 |
| Comparative Example 5 | A1 | 0.76 | B24 | 0.38 | C1 | 3.81 | −9.7 |

From the Table 2 above, it can be confirmed that when the copolymer including an oxyalkylene unit and a styrene unit and/or an alkylene unit was used, the viscosity of the conductive material dispersion was reduced by 20% or greater compared to the reference solution.

However, as shown in Table 3, in the case of Comparative Examples 1 to 5 in which the copolymer not satisfying the composition of the present invention was used as an auxiliary dispersant, the viscosity of the conductive material dispersion was rather increased.

The invention claimed is:

1. An electrode comprising an electrode active material layer, the electrode material active layer comprising:

a carbon-based conductive material; and a dispersant;

wherein the dispersant includes a main dispersant and an auxiliary dispersant, wherein:

the main dispersant is a nitrile-based copolymer; and the auxiliary dispersant is a copolymer including an oxyalkylene unit and at least one of a styrene unit or an alkylene unit.

2. The electrode of claim 1, wherein the nitrile-based copolymer includes a α,β-unsaturated nitrile-derived unit and a conjugated diene-derived unit.

3. The electrode of claim 2, wherein a weight ratio of the α,β-unsaturated nitrile-derived unit to the conjugated diene-derived unit ranges from 10 to 50:50 to 90.

4. The electrode of claim 1, wherein the nitrile-based copolymer includes a repeating unit represented by [Formula 1] below and a repeating unit represented by [Formula 2] below:

[Formula 1]

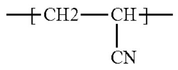

[Formula 2]

$$-[CH2-CH2-CH2-CH2]-.$$

5. The electrode of claim 4, wherein the content of the repeating unit represented by [Formula 1] ranges from 10 to 50 wt % and the content of the repeating unit represented by [Formula 2] ranges from 50 to 90 wt %.

6. The electrode of claim 2, wherein the nitrile-based copolymer has a hydrogenation rate of the conjugated diene-derived unit of 80% or greater.

7. The electrode of claim 1, wherein the main dispersant is a nitrile-based copolymer having a weight average molecular weight ranging from 20,000 to 300,000 g/mol.

8. The electrode of claim 1, wherein the auxiliary dispersant comprises an oxyalkylene unit in an amount ranging from 9 wt % to 85 wt %.

9. The electrode of claim 1, wherein the auxiliary dispersant is a copolymer having a weight average molecular weight ranging from 800 to 30,000 g/mol.

10. The electrode of claim 1, wherein the main dispersant and the auxiliary dispersant are included at a weight ratio ranging from 30:70 to 90:10.

11. The electrode of claim 1, wherein the carbon-based conductive material is a carbon nanotube having a BET specific surface area ranging from 100 to 1000 $m^2/g$.

12. The electrode of claim 1, wherein the carbon-based conductive material is carbon black having a BET specific surface area ranging from 30 to 1000.

13. The electrode of claim 1, wherein the dispersion medium is an organic solvent including one or more hetero atoms selected from the group consisting of a nitrogen atom and an oxygen atom.

14. The electrode of claim 1, wherein:

the main dispersant is a nitrile-based copolymer having a weight average molecular weight ranging from 10,000 to 100,000 g/mol;

the auxiliary dispersant is a copolymer including an the oxyalkylene unit, the styrene unit, and the alkylene unit; and the carbon-based conductive material is a carbon nanonube having a BET specific surface area ranging from 100 to 1000 $m^2/g$.

15. A lithium secondary battery comprising a positive electrode, a negative electrode, a separator interposed between the positive electrode and the negative electrode, and an electrolyte, wherein the positive electrode is the electrode of claim 1.

16. An electrode comprising an electrode active material layer, the electrode active material layer comprising:

a carbon-based conductive material; and a dispersant;

wherein the dispersant includes a main dispersant and an auxiliary dispersant, wherein:

the main dispersant is a nitrile-based copolymer; and the auxiliary dispersant is a copolymer including an oxyalkylene unit and at least one of a styrene unit or an alkylene unit, wherein the conductive material dispersion satisfies Equation (1) below when the content of the main dispersant is W1(wt %), the content of the auxiliary dispersant is W2(wt %), the content of the carbon-based conductive material is W3(wt %), and the BET specific surface area value of the conductive material is A($m^2/g$) in the conductive material dispersion:

$$0.07A \le \{(W1+W2)/W3\} \times 100 \le 0.3A \qquad \text{Equation (1).}$$

17. The electrode of claim 16, wherein the nitrile-based copolymer includes a α,β-unsaturated nitrile-derived unit and a conjugated diene-derived unit.

18. The electrode of claim 17, wherein a weight ratio of the α,β-unsaturated nitrile-derived unit to the conjugated diene-derived unit ranges from 10 to 50:50 to 90.

* * * * *